J. Crary,
Cutting Shingles.
No. 604. Reissued Sep. 28, 1858.
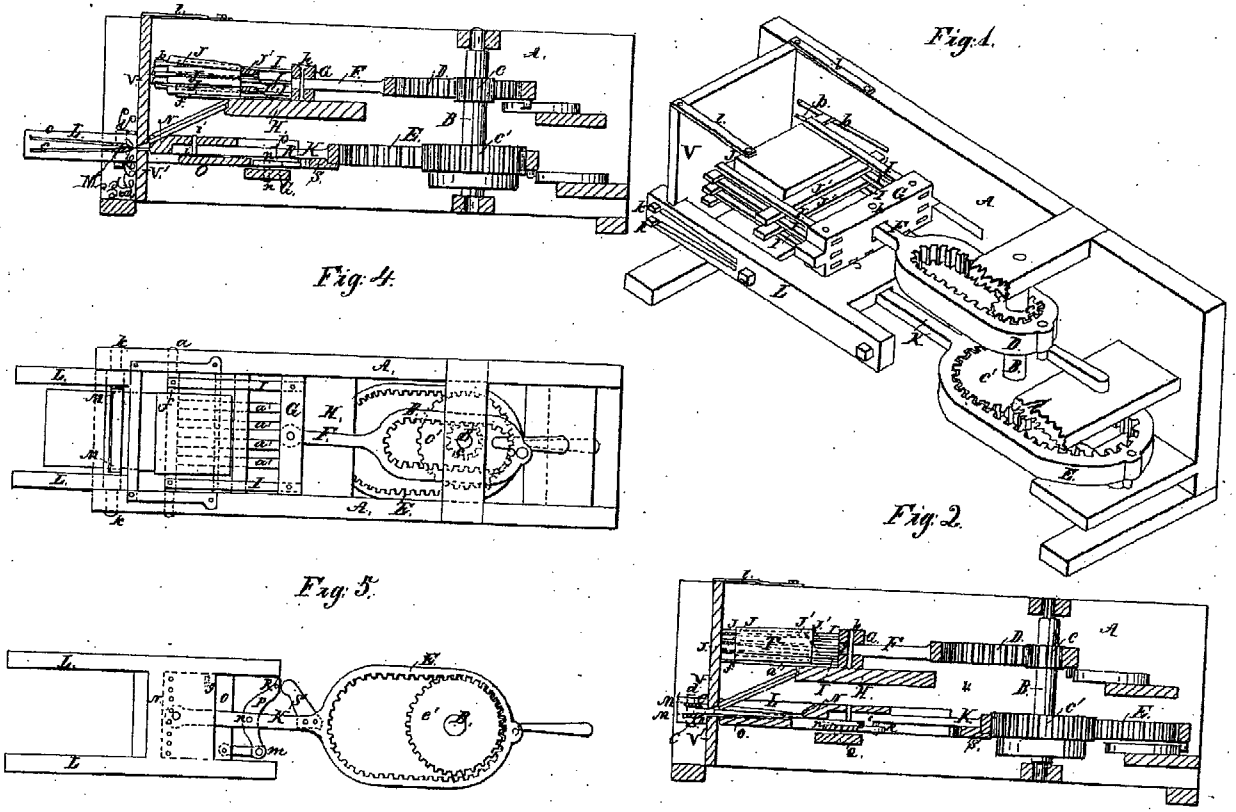
A.M. PHOTO-LITHO. CO. N.Y. (OSBORNE'S PROCESS)

UNITED STATES PATENT OFFICE.

JAMES CRARY, OF MIDDLEPORT, OHIO.

IMPROVED SHINGLE-MACHINE.

Specification forming part of Letters Patent No. 18,681, dated November 24, 1857; Reissue No. 604, dated September 28, 1858.

*To all whom it may concern:*

Be it known that I, JAMES CRARY, of Middleport, in the county of Meigs and State of Ohio, have invented a new and useful Improvement in Shingle-Machines; and I do hereby declare that the following is a full, clear, and exact description thereof, reference being had to the annexed drawings, forming part of this specification, in which—

Figure 1 is a longitudinal vertical section of my machine, the plane of section being through the center. Fig. 2 is a vertical longitudinal section of my machine, showing three shingle bolts riven, the lowest one being about to be shaved, and the froes about to rive three more bolts from the block of wood. Fig. 3 is a similar section to Fig. 2, excepting that one bolt has nearly passed through the shaving-knives and the knives have entered the block of wood to rive three more bolts. Fig. 4 is a plan or top view of my machine. Fig. 5 is a plan or top view of the sliding frame and feed-board, showing its connection with its rack and feed-board.

My invention consists in certain improvements, hereinafter specified, in machines for riving and shaving shingles—that is to say, in the use of a set of two or more froes for riving two or more shingle-bolts from a block of wood at one stroke of the machine, thus obviating a great difficulty in riving shingles by machinery, that the bolt is apt to eat toward the point, splitting off too thin and short to form a shingle; also, the use of brace-bars, arranged so as to receive the froes, which encase themselves between the bars, and thus insure the perfect splitting and separation of the shingle-bolts from the block of wood; also, the arrangement of the shaving-knives in converging grooves to secure an uniform approximating motion as the bolt passes through them from butt to point; also, the peculiar arrangement and combination of a lever and its pin with cams for the purpose of communicating the proper relative motion to the vibrating feed-board, driver, and frame whereby all the bolts riven at a single stroke of the machine are, during the next stroke and while another set of bolts are being severed from the block, successively driven through the shaving-knives, and yet only one at a time, no matter how short or thin the bolt may have been froed.

A great difficulty experienced in shingle-machines which rive a single bolt at a time from the block of wood is that the bolt is apt to split too fine toward the point or thinner at one side than the other, and where more than one bolt is in the machine awaiting the operation of the shaving-knives it is very difficult to adjust the operation of the machinery to bolts of various thickness so as to carry one only of the bolts at a time to the throat of the shaving-knives. These difficulties are successfully obviated by my machine, which is also so arranged that at each stroke of the machine a number (two, three, or more) of bolts are riven, and during the same stroke the same number of bolts riven at previous stroke are successively shaved.

In order to enable others skilled in the art to make and use my improvements, I will proceed to describe their construction and operation.

In the drawings, A is a strong rectangular frame, within which the several parts of my machine are placed. In Fig. 1 those parts of the machinery above the level of the bed-plate H operate to rive the bolts, and those parts below the level of H operate to shave them. My drawings represent the machine arranged with three froes, J J, &c., which is a convenient number, but it may be made with only two, or with more than three, as may be desired; but as the bolts riven by the machinery above H at one stroke or revolution of the shaft are at the next revolution all shaved one after the other, the pitman F gives one stroke to the froes, while the pitman K, which operates the apparatus for carrying the bolts to and forcing them between the shaving-knives, makes three strokes if there are three froes in the machine, or as many strokes in the same time as there are bolts riven at one stroke of the upper pitman, F. This is effected as follows: Near the rear end of the machine is a perpendicular shaft, B. This shaft carries two pinions. One, C, above the level of the bed-plate H, gears into an endless rack D, and the other pinion, C′, below the level of the bed-plate H, gears into the endless rack E. The relative size of the pinions C and C′ is determined by the number of froes in the machine. If there are three froes, the lower pinion, C′, must be so much larger than the pinion C as to cause the rack E to pass around its pinion C′ three times, while the rack D passes around its pinion C once. From the front end of the rack D projects the pitman F. This is pivoted at *h* to the bar G, and communicates a horizontal reciprocating motion to it. To the under side of the bar G are attached four or more strong gage-springs, *a′ a′*, which are united at their extremities by the driver *f*, placed parallel to the bar G. At either end of the bar G are three arms, I I I, projecting horizontally from the bar G, parallel with and near to the sides A A of the machine; and to the end of these arms are attached the froes or riving-knives J J J, placed horizontally one above the other, parallel to the bar G, above and a little inside of the outer edge of the driver *f*. These froes J have their knife-edges pointing inward toward the bar G, and each froe is carried by its two arms, I I. The bar G and guide-springs *a′ a′* slide upon and are supported by the bed-plate H, which is a horizontal shelf, firmly fixed to the frame A A of the machine, and extending from the bar G to a point a little beyond the edge of the driver *f*, (when the bar G is drawn back,) the projecting end of the bed-plate H forming a ledge, *e*. Each of the arms I has two wrists, *a*, one at either end, which project through slots *b b b* in the sides of the frame A A. These slots are set obliquely to each other, so that the wrists *a a*, working in them not only guide the froes J J to enter the block of wood at a uniform distance apart, in order to make the butt of each shingle of a like thickness, but also cause the froes to separate as they recede through the block of wood, in order to allow for the passage of the bolts which are being riven between them and to aid in the riving process and to give space for any curves, inequalities, or unevenness in the grain of the block of wood T from which the bolts are being severed. Between the froes J J are placed horizontal bars, J′ J′, (two of them when there are three froes,) firmly attached to the sides of the machine, as the pressure of the block T when the froes are riving comes against them. These bars J J are exactly parallel to the froes, and placed at the inner end of and between the slots *b b*, so that when the froes are drawn back through the block of wood T they incase themselves between these bars J′ J′, thus insuring the entire separation of the bolts from the block of wood T.

I have thus described the construction of the upper or riving portion of my machine, and its operation is very simple.

The froes J J J being at the end of their outward stroke, (in the position indicated in Fig. 2,) the block of wood is placed on the gage-springs *a′ a′*, between the edge of the froes and the bars J J′, being supported by the bed-plate H. The inward stroke of the pitman F forces the froes through the lower edge of the block T, the froes being accurately guided by their wrists *a a* in the oblique slots *b b*, and kept so far apart during their passage through the block as to prevent their choking or sticking fast. Thus the froes pass through the block of wood and incase themselves between the bars J J′, leaving the three bolts to fall down one on top of the other, with their butt ends on the feed-board O, and the other ends resting on the end of the driver *f* until, on the return stroke of the pitman F, the driver *f* pushes them off onto the ledge *e*, or projecting end of the bed-plate H, (see Fig. 2,) whence they are afterward drawn down level onto the feed-board O in the lower part of the machine, as hereinafter described, where they go through the shaving or tapering process, which I will proceed to explain.

Immediately below the bed-plate H is a horizontal sliding frame which slides inside of the frame of the machine, the side pieces L L being placed parallel with and resting against the side pieces A A of the machine. This sliding frame is composed of two side pieces, L L, united to a horizontal board, N, which acts as a driver, as hereinafter explained. This sliding frame is pivoted at *i* (on the board N) to the pitman K, and thereby receives a continuously-reciprocating motion, making three complete strokes (if there are three froes in the machine) for each complete stroke of the froes, as before explained.

The side pieces L L′ of the sliding frame have each two converging slots, *c c*, made through them. The obliquity of these slots is made to correspond with the taper to be given to the shingles.

M M′ are a pair of shaving or tapering knives, placed at the forward end of the machine, with wrists *k k*, which pass through the converging slots *c c* in the side pieces L L of the sliding frame, and through vertical slots *d d* in the side pieces A A of the machine. When the sliding frame is drawn back as seen in Fig. 1, the side pieces L L are within the machine, and the knives are, by the joint action of the vertical slots *d d* and converging slots *c c*, opened as far apart as possible; but when the sliding frame is pushed forward to force a shingle between the knives M M′ the side pieces L L project beyond the frame A A, as seen in Figs. 3 and 4, and the knives are gradually drawn together by the action of the slots *c* and *d* on the wrists *k* of the knives M M′.

Immediately in front of the knives are two throat-plates, placed vertically and extending across the machine. The top of the lower throat-plate, V′, is on a level with the edge of the under shaving-knife M, and the bottom of the upper throat-plate, V, is on a level with the edge of the upper shaving-knife M, thus leaving a space between the throat-plates V V′ just wide enough to allow the butt-end of one shingle-bolt to pass to the knives, but no more. The upper throat-plate, V, is fastened to the machine by springs *l l*, to allow of any unevenness in the bolt as it passes through the throat-plates to the tapering-knives. The lower throat-plate is firmly fixed.

Between the sides L L of the sliding frame is situate the feed-board O, placed in front of the driver N, (see Fig. 2,) but just below its level, so as to slide under it. The feed-board is so connected with the sliding frame L and its driver N that whenever the driver is pushed forward toward the knives M M′ the feed-board O recedes under the driver, as seen in Fig. 3, and vice versa, whenever the driver N is drawn back, the feed-board advances toward the knives M M′. This vibration of the feed-board O in a direction contrary to that of the driver N and sliding frame L is effected by a lever, P, (see Fig. 5,) hinged or pivoted at one end (at M) to the back edge of the feed-board O. At its center *n* the lever P is pivoted to a cross-bar, Q, (see Fig. 3,) in the frame A (which does not, of course, move with the sliding frame L.) The other end of the lever P (opposite to *m*) has a pin, R, attached to it, which pin enters a recess or sunken cam, *g*, in the under side of the driver N in the sliding frame L. Thus, when the driver N is pushed by the pitman K inward toward the shaft B, the pin R at the end of the lever P passing inward while the center of the lever (at *n*) is fixed to Q and stationary, it causes the lever P to turn and presses forward the feed-board O (pivoted to lever P at *m*) toward the knives M M′, and on the return stroke of the pitman K the projecting cam S (which by coming in contact with lever P when the driver N presses toward the knives M M′) reverses the motion of the feed-board O and draws it back under the driver N. The feed-board O is furnished with a row of steel points or teeth, *s s s*, placed near its outer edge, which point obliquely outward, and are designed to catch the lowest shingle and draw it from the ledge *e* entirely onto the feed-board, so that it may be passed through the knives M M′.

When the bolts have been froed, as before described, and lie the bottom one with its butt resting on the feed-board and its other end against the ledge *e* of the bed-plate H, and the other bolts on top of the lowest one, as the pitman F recedes to cut another pack of bolts, the pitman K also recedes and draws back the driver N, but pushes the feed-board O forward toward the knives M M′. The teeth *s s s* catch the undermost shingle and draw it off the ledge *e*, level on the feed-board in front of the opening between the throat-plates V V′ (see Fig. 2). The pitman K then returns and the feed-board O recedes, while the front edge of the driver N presses against the end of the bolt and forces it through the throat-plates V V′ and between the knives M M′. As the bolt passes through the knives, the slots *c c* in the sliding frame L L cause the knives M M′ to converge uniformly, and in so doing they shave or cut the shingle on both sides, tapering it from butt to point. (See Fig. 3.) So soon as the finished shingle has passed through the knives out of the machine the second bolt is caught by the feed-board O and placed between the throat-plates and then shaved, and so on, all three bolts being finished by the time the froes have rived three more bolts ready for shaving, and thus the machine is kept in uninterrupted operation.

Having thus described my improved shingle-machine, what I claim as my invention, and desire to secure by Letters Patent, is—

1. The use of a set of two or more froes, arranged substantially as hereinbefore described, for the purpose of riving two or more bolts from the block of wood at the same time, thus preventing the tendency of the wood to eat out or split too thin at one end or at either side.

2. The use of brace-bars, or their equivalents, so arranged in combination with the froes as that the froes will incase themselves between them, thus securing the perfect separation and delivery of the bolts from the block.

3. The use of sliding side pieces L L with converging slots *c c*, in combination with the upright grooves *d d* in the frame, in which the wrists of the shaving-knives are inserted for the purpose of effecting the gradual approximation of the shaving-knives in the proper taper of the shingles.

4. The combination of the lever P with its pin R, the projecting cam S and cam *g* on the frame L L, for the purpose of communicating the requisite relative motion to the vibrating feed-board O, the driver N, and frame L L, whereby one bolt only at a time of the two, three, or more riven by the froes is driven outward and forced through the shaving-knives, no matter how short or thin the bolt may have been froed.

In testimony whereof I have hereunto set my hand this 28th day of July, A. D. 1858.

JAMES CRARY.

Witnesses:

MARTIN G. CUSHING,
L. P. STONE.